US012783251B2

(12) United States Patent
Ye et al.

(10) Patent No.: US 12,783,251 B2
(45) Date of Patent: Nov. 3, 2026

(54) METHOD AND APPARATUS OF BOOTING APPLICATION, SERVER, AND NON-VOLATILE READABLE STORAGE MEDIUM

(71) Applicant: SUZHOU METABRAIN INTELLIGENT TECHNOLOGY CO., LTD., Suzhou (CN)

(72) Inventors: Xiaoxi Ye, Suzhou (CN); Xinglong Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/137,871

(22) PCT Filed: Dec. 25, 2023

(86) PCT No.: PCT/CN2023/141687
§ 371 (c)(1),
(2) Date: Jun. 11, 2025

(87) PCT Pub. No.: WO2024/244436
PCT Pub. Date: Dec. 5, 2024

(65) Prior Publication Data

US 2026/0017064 A1 Jan. 15, 2026

(30) Foreign Application Priority Data

May 29, 2023 (CN) ......................... 202310617100.8

(51) Int. Cl.
*G06F 9/4401* (2018.01)
*G06F 11/14* (2026.01)
*G06F 21/57* (2013.01)

(52) U.S. Cl.
CPC ........ *G06F 9/4401* (2013.01); *G06F 11/1417* (2013.01); *G06F 21/575* (2013.01); *G06F 2201/805* (2013.01)

(58) Field of Classification Search
CPC ................ G06F 9/4401; G06F 21/575; G06F 11/1417; G06F 2201/805
(Continued)

(56) References Cited

U.S. PATENT DOCUMENTS 12,399,983 B1 * 8/2025 Bevis .................... G06F 21/575
2004/0260936 A1 * 12/2004 Hiray .................... G06F 9/4405 726/16
(Continued)

FOREIGN PATENT DOCUMENTS

CN 101042720 A 9/2007
CN 103365696 A 10/2013
(Continued)

OTHER PUBLICATIONS

The first search report of CN application No. 202310617100.8 issued on Jun. 29, 2023.
(Continued)

*Primary Examiner* — Ji H Bae
(74) *Attorney, Agent, or Firm* — Scully, Scott, Murphy & Presser, P.C.

(57) ABSTRACT

A method and an apparatus of booting an application, a server, and a non-volatile readable storage medium. The method includes: transmitting, by a baseboard manager controller, booting instruction information to a processor; receiving first verification information transmitted by the processor in a booting process of the target application by the processor; and transmitting, in a case that it is deter-
(Continued)

mined that no fault exists in the booting process, the mirror image file to the processor until the processor completes the booting process.

18 Claims, 4 Drawing Sheets

(58) Field of Classification Search
USPC ............................................ 713/1, 2; 726/22
See application file for complete search history.

(56) References Cited

U.S. PATENT DOCUMENTS

| | | | | |
|---|---|---|---|---|
| 2013/0339713 | A1* | 12/2013 | Huang | G06F 21/572 713/2 |
| 2015/0355911 | A1* | 12/2015 | Bibb, Jr. | G06F 21/572 713/2 |
| 2018/0285180 | A1 | 10/2018 | Teshome | |
| 2020/0218613 | A1* | 7/2020 | Lambert | G06F 11/1417 |
| 2021/0064734 | A1* | 3/2021 | Chen | G06F 21/575 |

FOREIGN PATENT DOCUMENTS

| | | | |
|---|---|---|---|
| CN | 111008379 | A | 4/2020 |
| CN | 113064646 | A | 7/2021 |
| CN | 113064747 | A | 7/2021 |
| CN | 113111343 | A | 7/2021 |
| CN | 115795477 | A | 3/2023 |
| CN | 115827069 | A | 3/2023 |
| CN | 116107819 | A | 5/2023 |
| CN | 116340957 | A | 6/2023 |

OTHER PUBLICATIONS

The search report of PCT application No. PCT/CN2023/141687 issued on Mar. 28, 2024.
The second search report of CN application No. 202310617100.8 issued on Jul. 18, 2023.

* cited by examiner

METHOD AND APPARATUS OF BOOTING APPLICATION, SERVER, AND NON-VOLATILE READABLE STORAGE MEDIUM

CROSS-REFERENCE TO RELATED APPLICATION

The disclosure claims the priority to Chinese Patent Application No. 2023106171008, filed with the Chinese Patent Office on May 29, 2023 and entitled "Method and apparatus of booting application, server, and non-volatile storage medium", which is incorporated in its entirety herein by reference.

TECHNICAL FIELD

Examples of the disclosure relate to the technical field of computers, and particularly relate to a method and an apparatus of booting an application, a server, and a non-volatile readable storage medium.

BACKGROUND

In the related art, only standby voltage is required for a booting process of a basic input output system (BIOS) application. In the booting process, other devices fail to monitor whether an abnormality exists in the booting process of the BIOS application. As a result, when the BIOS fails to be booted, it is impossible to quickly and accurately determine the step at which the BIOS has a fault and fails to be booted.

SUMMARY

Examples of the disclosure provide a method and an apparatus of booting an application, a server, and a non-volatile readable storage medium, so as to at least solve a problem that a phase in which a fault occurs cannot be quickly and accurately located when a basic input output system (BIOS) application fails to be booted due to independent running of a booting process of the BIOS application in the related art.

An example of the disclosure provides a method for booting an application. The method includes: transmitting, by a baseboard manager controller, booting instruction information to a processor, where a mirror image file of a target application is stored in the baseboard manager controller, and the booting instruction information is configured to instruct the processor to boot the target application according to the mirror image file; receiving first verification information transmitted by the processor in a booting process of the target application by the processor, wherein the first verification information is configured to determine whether a fault exists in the booting process of the target application; and transmitting, in a case that it is determined that no fault exists in the booting process, the mirror image file to the processor until the processor completes the booting process.

In some illustrative examples, the booting process includes a plurality of booting phases. The first verification information is verification information generated by the processor after completing a first booting phase; the first booting phase is any booting phase of the plurality of booting phases except the last booting phase, and different booting phases correspond to different first verification information.

2

In some illustrative examples, after the receiving first verification information transmitted by the processor, the method of booting an application further includes: determining second verification information corresponding to the first booting phase, wherein the second verification information is verification information pre-stored in the baseboard manager controller; and comparing the first verification information and the second verification information, and determining, in a case that it is determined that the first verification information is consistent with the second verification information, that no fault exists in the first booting phase.

In some illustrative examples, the transmitting the mirror image file to the processor includes: transmitting, after it is determined that no fault exists in the first booting phase, a mirror image file corresponding to a second booting phase to the processor; the second booting phase is a booting phase whose booting sequence is after the first booting phase and which is adjacent to the first booting phase in the plurality of booting phases.

In some illustrative examples, after it is determined that no fault exists in the first booting phase, the method of booting an application further includes: generating a first log file corresponding to the first booting phase; the first log file is configured to record successful boot of the first booting phase.

In some illustrative examples, after the comparing the first verification information with the second verification information, the method of booting an application further includes: determining, in a case that it is determined that the first verification information is inconsistent with the second verification information, that a booting failure exists in the first booting phase; generating a second log file corresponding to the first booting phase, where the second log file is configured to record identity information of the first booting phase and the first verification information and the second verification information corresponding to the first booting phase; and transmitting the second log file to a target device, where the target device is configured to determine whether the target application is successfully booted.

In some illustrative examples, the transmitting, by a baseboard manager controller, booting instruction information to a processor includes: determining a switching state of a target switch, where the switching state includes a first state and a second state, the first state is configured to indicate that the booting process of the target application is completed jointly by the baseboard manager controller and the processor, and the second state is configured to indicate that the booting process of the target application is completed independently by the processor; and transmitting the booting instruction information to the processor according to the switching state.

In some illustrative examples, the transmitting the booting instruction information to the processor according to the switching state includes: transmitting, by the baseboard manager controller, the booting instruction information to the processor in a case that it is determined that the switching state is the first state; controlling, in a case that it is determined that the switching state is the second state, that the booting instruction information is not transmitted to the processor, and receiving, in a case that it is determined that the booting process of the target application is completed independently by the processor, the first verification information transmitted by the processor; and generating a third log file according to the first verification information, wherein the third log file is configured to record process information of the booting process.

In some illustrative examples, before the transmitting, by a baseboard manager controller, booting instruction information to a processor, the method of booting an application further includes: obtaining the mirror image file of the target application; and obtaining second verification information and a correspondence between the second verification information and a booting phase of the booting process, and storing the second verification information in one or more preset bits of the mirror image file.

Another example of the disclosure provides a method for booting an application. The method includes: receiving, by a processor, booting instruction information transmitted by a baseboard manager controller, where a mirror image file of a target application is stored in the baseboard manager controller, and the booting instruction information is configured to instruct the processor to boot the target application according to the mirror image file; transmitting first verification information to the baseboard manager controller in a booting process of the target application booted by the processor, wherein the first verification information is configured to indicate whether a fault exists in the booting process of the target application; and receiving the mirror image file transmitted by the baseboard manager controller according to the first verification information, and completing the booting process according to the mirror image file.

In some illustrative examples, the booting process includes a plurality of booting phases. The first verification information is verification information generated by the processor after completing a first booting phase; the first booting phase is any booting phase of the plurality of booting phases except the last booting phase, and different booting phases correspond to different first verification information.

In some illustrative examples, second verification information corresponding to the first booting phase is stored in the baseboard manager controller; in a case that it is determined that the first verification information is consistent with the second verification information, it is determined that no fault exists in the first booting phase.

In some illustrative examples, before the receiving, by a processor, booting instruction information transmitted by a baseboard manager controller, the method of booting an application further includes: determining a switching state of a target switch, wherein the switching state includes a first state and a second state, the first state is configured to indicate that the booting process of the target application is completed jointly by the baseboard manager controller and the processor, and the second state is configured to indicate that the booting process of the target application is completed independently by the processor; receiving, in a case that it is determined that the switching state is the first state, the booting instruction information transmitted by the baseboard manager controller; and directly executing, in a case that it is determined that the switching state is the second state, the booting process of the target application.

In some illustrative examples, the directly executing the booting process of the target application includes: transmitting, after any booting phase of the plurality of booting phases is completed, the first verification information to the baseboard manager controller, and continuing to execute the booting process until all the booting phases are completed.

Yet another example of the disclosure provides a server. The server includes: a baseboard manager controller, a processor, and a target switch. The baseboard manager controller is configured to store a mirror image file of a target application. The processor is configured to complete a booting process of the target application. A switching state of the target switch includes a first state and a second state. The first state is configured to indicate that the booting process of the target application is completed jointly by the baseboard manager controller and the processor. The second state is configured to indicate that the booting process of the target application is completed independently by the processor. The baseboard manager controller is further configured to transmit, in a case that it is determined that the switching state is the first state, booting instruction information to the processor; the booting instruction information is configured to instruct the processor to boot the target application according to the mirror image file; receive first verification information transmitted by the processor in the booting process of the target application by the processor, wherein the first verification information is configured to indicate whether a fault exists in the booting process of the target application; and transmit, in a case that it is determined that no fault exists in the booting process of the target application according to the first verification information, the mirror image file to the processor until the processor completes the booting process.

In some illustrative examples, in a case that it is determined that the switching state is the second state, the processor independently completes the booting process of the target application, and transmits the first verification information to the baseboard manager controller in the booting process; the baseboard manager controller is configured to generate a log file, which is configured to record process information of the booting process according to the first verification information.

In some illustrative examples, the baseboard manager controller includes a storage module. The storage module is configured to store the mirror image file of the target application, and store second verification information in one or more preset bits of the mirror image file of the target application; the second verification information is configured to indicate whether a fault exists in the booting process together with the first verification information.

In some illustrative examples, in a case that it is determined that the switching state is the first state, the baseboard manager controller is further configured to generate a log file, which is configured to record whether a fault exists in the booting process according to the first verification information and the second verification information.

In some illustrative examples, the server further includes an alarm apparatus. The alarm apparatus is connected to the baseboard manager controller. After the baseboard manager controller determines that a fault exists in the booting process of the target application, the alarm apparatus is configured to generate alarm information under the control of the target application.

In some illustrative examples, the baseboard manager controller is connected to the processor through a wired communication link.

Yet another example of the disclosure provides an apparatus for booting an application. The apparatus includes: a first processing module configured to transmit booting instruction information to a processor, where a mirror image file of a target application is stored in the baseboard manager controller, and the booting instruction information is configured to instruct the processor to boot the target application according to the mirror image file; a second processing module is configured to receive first verification information transmitted by the processor in a booting process of the target application by the processor, where the first verification information is configured to determine whether a fault exists in the booting process of the target application; and a third processing module is configured to transmit, in a case that it is determined that no fault exists in the booting process according to the first verification information, the mirror image file to the processor until the processor completes the booting process.

Yet another example of the disclosure further provides a non-volatile readable storage medium. The non-volatile readable storage medium stores a computer program. The computer program is configured to execute steps of any one of the method examples at runtime.

Still another example of the disclosure further provides an electronic device. The electronic device includes a memory and a processor. A computer program is stored in the memory. The processor is configured to run the computer program, so as to execute steps of any one of the method examples.

In the disclosure, in the booting process of the target application, the processor needs to transmit the first verification information configured to determine whether a fault exists in the booting process to the baseboard manager controller, receive the mirror image file transmitted after the baseboard manager controller determines that no fault exists, and then continue to execute the booting process according to the mirror image file. Thus, a problem that a phase in which a fault occurs cannot be quickly and accurately located when a BIOS application fails to be booted due to independent running of the booting process of the BIOS application in the related art can be solved, thus achieving an effect of quickly locating the phase in which a fault occurs when the BIOS application fails to be booted.

DETAILED DESCRIPTION OF THE EMBODIMENTS

Figure 1:
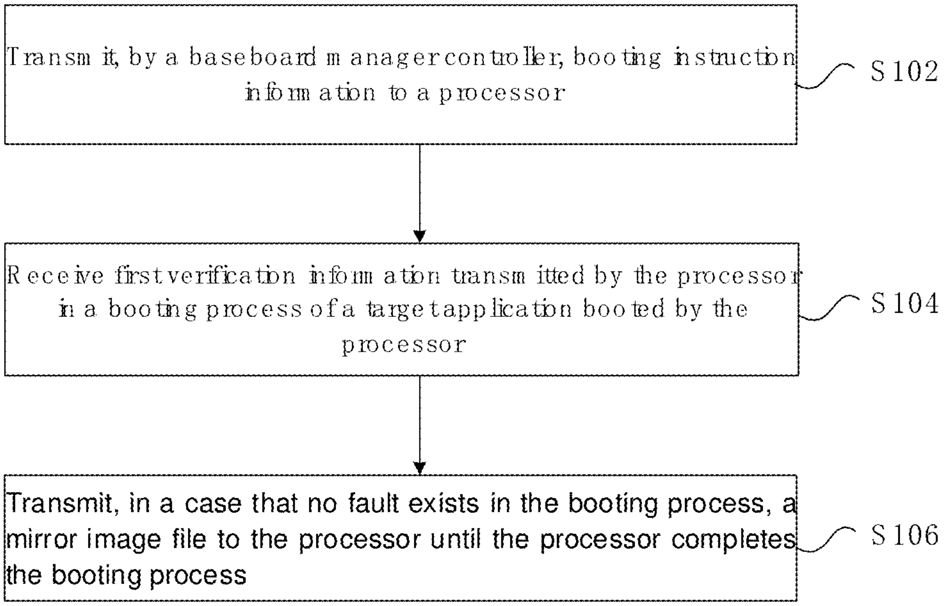
FIG. 1 is a flowchart of a method of booting an application according to an example of the disclosure.

Examples of the disclosure will be described in detail below with reference to the accompanying drawings in conjunction with the examples. Obviously, the examples described are merely some examples rather than all examples of the disclosure. Based on the examples of the disclosure, all other examples obtained by those of ordinary skill in the art without making creative efforts should fall within the protection scope of the disclosure.

It should be noted that the terms such as “first” and “second” in the description and claims of the disclosure and in the drawings are configured to distinguish between similar objects and not necessarily to describe a particular order or sequential order. It should be understood that data used in this way may be interchanged where appropriate, such that the examples of the disclosure described herein may be implemented in other sequences than those illustrated or described herein. Moreover, the terms “include”, “comprise” and “have” as well as any variations thereof are intended to cover non-exclusive inclusion. For instance, a process, a method, a system, a product or a device including a series of steps or units does not need to be limited by those explicitly listed, and may include other steps or units not explicitly listed or inherent to these processes, methods, products, or devices.

In order to better understand the examples of the disclosure, the technical terms involved in the examples of the disclosure will be explained as follows:

A basic input output system (BIOS) application is described as follows: the BIOS application is an application solidified on a read-only memory (ROM) chip on a mainboard in a computer, stores a most important basic input output program of the computer, a self-check program after booting and a system self-booting program, and may read and write information configured by a system. The BIOS application serves as a way ahead booting of an operating system (OS), and is a first step for booting of a server or another electronic device.

A baseboard manager controller (BMC) is described as follows: the BMC is also referred to as baseboard manager controller, is an overall monitoring system of the server, and is configured to monitor a running state of the server. When the system does not boot, is down or runs abnormally, various information of the server may be obtained and provided for the operation and maintenance personnel, thus implementing early warning and alarming.

In the related art, only standby voltage is required to boot the BIOS application, and the BIOS application is controlled by circuit logic of a complex programming logic device (CPLD), and may be booted after the CPLD receives a POWER_ON signal. Moreover, other devices or modules such as the BMC are not connected in an entire booting process, and the BMC fail to monitor booting of a BIOS. If the BIOS encounters a failure in the booting process, the BIOS fails to be booted. The BMC and other devices are not related to the booting process of the BIOS application. Thus, it is impossible to quickly and accurately know the booting phase at which the BIOS fails to be booted in the booting process, and it is also impossible to feed back the failure in time. The operation and maintenance personnel has to check and read a log file by themselves to determine the booting phase of the failure.

In order to solve the above problems, the example provides a method for booting an application of a baseboard manager controller running in an electronic device. The electronic device may be a server, a terminal device, etc. FIG. 1 is a flowchart of a method of booting an application according to an example of the disclosure. As shown in FIG. 1, the flow includes the following steps:

S102, a baseboard manager controller transmits booting instruction information to a processor. A mirror image file of a target application is stored in the baseboard manager controller. The booting instruction information is configured to instruct the processor to boot the target application according to the mirror image file.

It should be noted that, in some illustrative examples, the baseboard manager controller and the processor may be connected to each other through a wired communication link and exchange information, thus reducing a probability of transmission failures that may occur in an information transmission process. The wired communication link may be an enhanced serial peripheral interface (eSPI), a low pin count bus (LPC), an inter-integrated circuit (I2C), etc. In addition, the target application in the disclosure may be a BIOS application or any other application that may be booted by phases. In the example, for the convenience of description, an optional embodiment of the disclosure is introduced with the BIOS application as an instance, which does not indicate that the method for booting an application according to the disclosure is only applicable to the BIOS application.

In the technical solution provided by S102, before the baseboard manager controller transmits the booting instruction information to the processor, the mirror image file of the target application and a verification code corresponding to each booting phase in the booting process of the target application further need to be stored in the baseboard manager controller. This step includes the following steps: the mirror image file of the target application is obtained; and second verification information and a correspondence between the second verification information and a booting phase are obtained, and the second verification information is stored in one or more preset bits of the mirror image file.

The mirror image file required to boot the BIOS application is stored in the baseboard manager controller. Thus, the baseboard manager controller may monitor the booting process of the BIOS application, and in a case that it is determined that the BIOS application boots abnormally, no mirror image file is provided for the processor, thus avoiding greater loss caused by the abnormal booting of the BIOS application.

Optionally, the mirror image file of the target application may be stored in a read only memory (ROM) of the baseboard manager controller, and a phase check code returned by the processor after each booting phase is completed is stored at a fixed bit of the mirror image file. A form of the phase check code may be determined according to a selected encryption means, and the encryption means and a form of the verification code are not limited herein. That is, any known encryption means may be used in the example. In addition, a correspondence between each phase check code and a corresponding booting phase may be stored in the baseboard manager controller, and a storage form may be to use a bit at which the phase check code is stored and identity information of the booting phase as a set of corresponding data. In this way, in the booting process of the BIOS application, the required phase check code may be quickly located through the correspondence, or a phase in which a fault occurs may be quickly determined when a failure occurs.

In some illustrative examples, the baseboard manager controller and the processor are further connected to a target switch. The target switch may be configured to control a booting method for the BIOS application by the processor. Optionally, when the baseboard manager controller transmits the booting instruction information to the processor, a switching state of a target switch may be determined first, wherein the switching state includes a first state and a second state, the first state is configured to indicate that the booting process of the target application is completed jointly by the baseboard manager controller and the processor, and the second state is configured to indicate that the booting process of the target application is completed independently by the processor; and the booting instruction information may be transmitted to the processor according to the switching state.

The first state may be a switched-on state, and the second state may be a switched-off state. Alternatively, the first state may be a switched-off state, and the second state may be a switched-on state.

Optionally, the step that the booting instruction information is transmitted to the processor according to the switching state includes: the baseboard manager controller transmits the booting instruction information to the processor in a case that it is determined that the switching state is the first state; in a case that it is determined that the switching state is the second state, that the booting instruction information is controlled not transmitted to the processor, and in a case that it is determined that the booting process of the target application is completed independently by the processor, the first verification information transmitted by the processor is received; and a third log file is generated according to the first verification information, where the third log file is configured to record process information of the booting process.

S104, the first verification information transmitted by the processor is received in the booting process of the target application by the processor. The first verification information is configured to determine whether a fault exists in the booting process of the target application.

Figure 2:
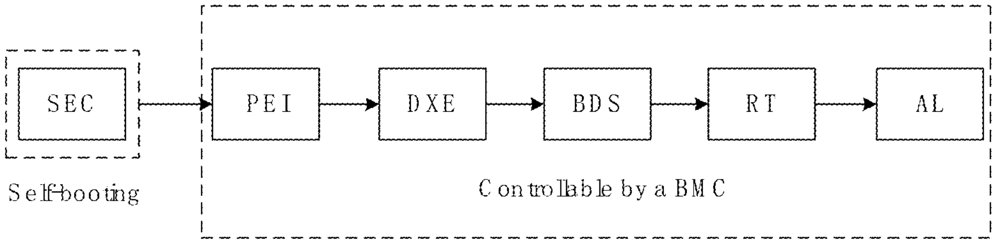
FIG. 2 is a schematic diagram of a booting phase of a basic input output system (BIOS) application according to an example of the disclosure.

In some illustrative examples, as shown in FIG. 2, the booting process of the BIOS application includes a plurality of booting phases, such as a security (SEC) phase, a pre-EFI initialization (PEI) phase, a driver execution environment (DXE) phase, a boot device selection (BDS) phase, a run time (RT) phase, and an after life (AL) phase. The first verification information is verification information generated after the processor completes a first booting phase. The first booting phase is any booting phase of a plurality of booting phases except a final booting phase. Different booting phases correspond to different first verification information. It should be noted that the booting phase shown in FIG. 2 is only for illustration, which does not indicate that an application booting process enabled by the method provided by the disclosure has to be the booting phase. The disclosure is still applicable to applications having different or completely different booting phases from FIG. 2.

As an optional embodiment, the case that the processor fails to complete a current booting phase within preset time may indicate that abnormality exists in the booting phase, and the first verification information with empty content or preset information is transmitted to the baseboard manager controller.

Figure 3:
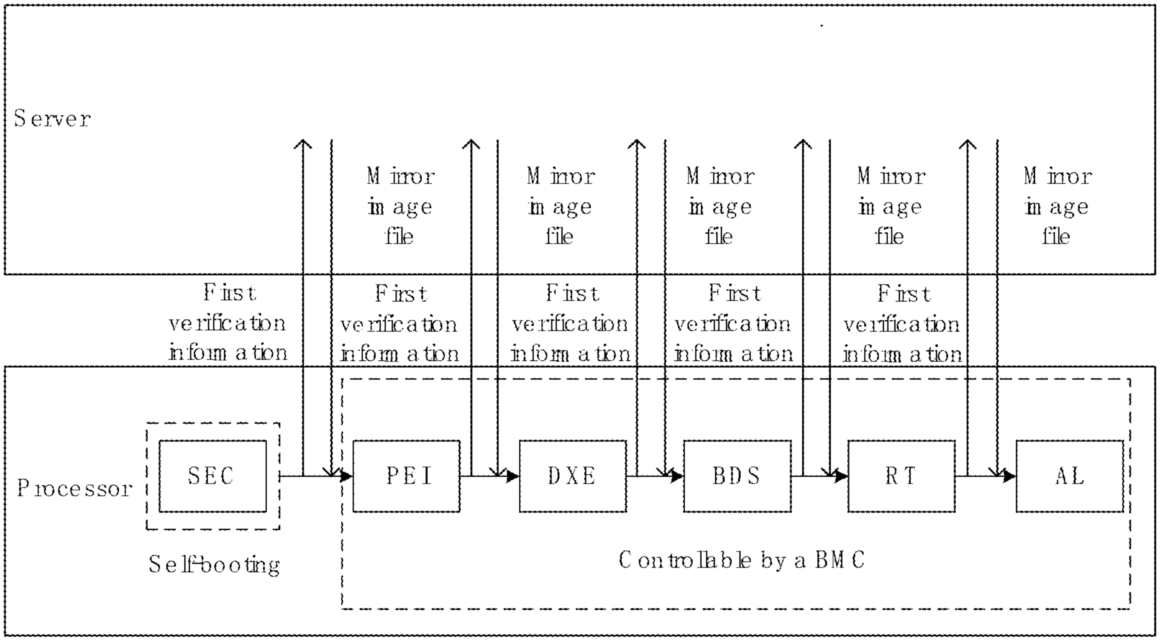
FIG. 3 is a schematic diagram of a booting process of a BIOS application according to an example of the disclosure.

In some illustrative examples, when a state of the target switch is the first state, the booting process of the BIOS application is as shown in FIG. 3, and the entire booting process needs to be completed by the baseboard manager controller and the processor. From FIG. 3, it may be seen that after the baseboard manager controller receives the first verification information transmitted by the processor, second verification information corresponding to the first booting phase may be determined, wherein the second verification information is verification information pre-stored in the baseboard manager controller; and the first verification information with the second verification information may be compared, and in a case that it is determined that the first verification information is consistent with the second verification information, it may be determined that no fault exists in the first booting phase. That is, in the first state, except for a self-booted SEC phase, every other remaining booting phase needs to be verified by the baseboard manager controller and the first verification information and the second verification information are determined to be consistent. Then, the processor may obtain a file from the baseboard manager controller and continue to complete the booting phase corresponding to the mirror image file according to the obtained mirror image file.

After each booting phase is completed, whether the booting phase is abnormal needs to be determined through the verification information, and then a mirror image file of a next phase is transmitted to the processor in a case that it is determined that no abnormality exists. Thus, the faulty booting phase may be accurately located, and the booting process may be terminated in time when the BIOS application is booted abnormally, thus avoiding greater loss.

As an optional embodiment, in the booting process of the BIOS application, the processor may transmit a corresponding first check code to the baseboard manager controller every time a booting phase is completed. After the baseboard manager controller receives the first check code, whether a check code the same as the first check code exists in all second check codes stored in the ROM may be determined. Moreover, in a case that it is determined that the check code the same as the first check code exists in all the second check codes, the currently completed booting phase is determined according to the second check code, and a mirror image file of a next booting phase is transmitted to the processor. When no same check code as the first check code is found, it may be determined that latest matching is completed and a verification result is a passed second check code in the booting process, a booting phase corresponding to the second check code may be determined according to the second check code that completes latest matching or a corresponding fixed bit, and a next booting phase of the booting phase is determined as the phase in which a fault occurs.

In order to improve security of the booting process and avoid leakage of the verification code, a storage location corresponding to the second check code stored in the BMC may be adjusted periodically according to a preset adjustment rule. For instance, a plurality of storage bits for later use may be provided for each second check code, and each second check code may be transferred from a current storage bit to any alternative storage bit every a particular period of time or after N booting processes.

As an optional embodiment, after it is determined that no fault exists in the first booting phase, the method of booting an application further includes: a first log file corresponding to the first booting phase is generated. The first log file is used to record successful boot of the first booting phase.

Optionally, after the first check code (the first verification information) and the second check code (the second verification information) are consistent, the baseboard manager controller determines that the first booting phase is booted successfully, information configured to record "success in matching of check codes of an XX phase" is generated, and the processor is allowed to obtain the mirror image file of the next phase.

In some illustrative examples of the disclosure, in a case that it is determined that the first verification information is inconsistent with the second verification information, the baseboard manager controller may determine that a booting failure exists in the first booting phase, and generate a second log file corresponding to the first booting phase, where the second log file is configured to record identity information of the first booting phase and the first verification information and the second verification information corresponding to the first booting phase; and transmit the second log file to a target device, where the target device is configured to determine whether the target application is successfully booted.

The target device is a terminal device or a monitoring device used by the operation and maintenance personnel. After receiving the second log file, the target device may generate warning information to remind the operation and maintenance personnel of a booting failure of the BIOS application, and determine the faulty booting phase according to content of the second log file. It may be seen that checking is conducted by the baseboard manager controller after each booting phase of the booting process of the BIOS application is completed, and a log file is generated according to a checking result so as to record the checking result, such that when the BIOS application fails to be booted, the phase in which a fault occurs may be quickly and accurately determined, and the operation and maintenance personnel do not need to check and read log files that may record a large amount of irrelevant data.

In some illustrative examples, when the switching state is the second state, the booting process of the BIOS application is independently completed by the processor. Moreover, in the entire booting process, the baseboard manager controller cannot control the booting process of the BIOS application, and may only passively obtain the first verification information from the processor and generate a log file according to the first verification information and the second verification information. That is, when the switching state is the second state, the baseboard manager controller may only play a recording role and cannot cut off the booting process of the BIOS application.

S106, in a case that it is determined that no fault exists in the booting process, the mirror image file is transmitted to the processor until the processor completes the booting process.

In the technical solution provided by S106, the step that the mirror image file is transmitted to the processor includes: after it is determined that no fault exists in the first booting phase, a mirror image file corresponding to a second booting phase is transmitted to the processor. The second booting phase is a booting phase whose booting sequence is after the first booting phase and which is adjacent to the first booting phase in the plurality of booting phases.

Only when the BIOS application is booted at the first booting phase and the first verification information is consistent with the second verification information, the processor may obtain the mirror image file of the next phase from the baseboard manager controller. In this way, when the BIOS application is attacked by the Trojan program or other programs, abnormality may be found in time through the verification information, and the mirror image file of the next phase may be no longer transmitted to the processor. Thus, leakage of the mirror image file of the BIOS application is avoided, and security of the server is protected.

The baseboard manager controller transmits the booting instruction information to the processor, wherein the mirror image file of the target application is stored in the baseboard manager controller, and the booting instruction information is configured to instruct the processor to boot the target application according to the mirror image file; the first verification information transmitted by the processor is received in the booting process of the target application by the processor, wherein the first verification information is configured to determine whether a fault exists in the booting process of the target application; and in a case that it is determined that no fault exists in the booting process, the mirror image file is transmitted to the processor until the processor completes the booting process. Thus, a problem that a phase in which a fault occurs cannot be quickly and accurately located when a BIOS application fails to be booted due to independent running of the booting process of the BIOS application in the related art is solved, thus achieving an effect of quickly locating the phase in which a fault occurs when the BIOS application fails to be booted.

An execution entity of the steps may be a baseboard manager controller in electronic devices such as a server and a terminal, and is not limited to the baseboard manager controller.

Figure 4:
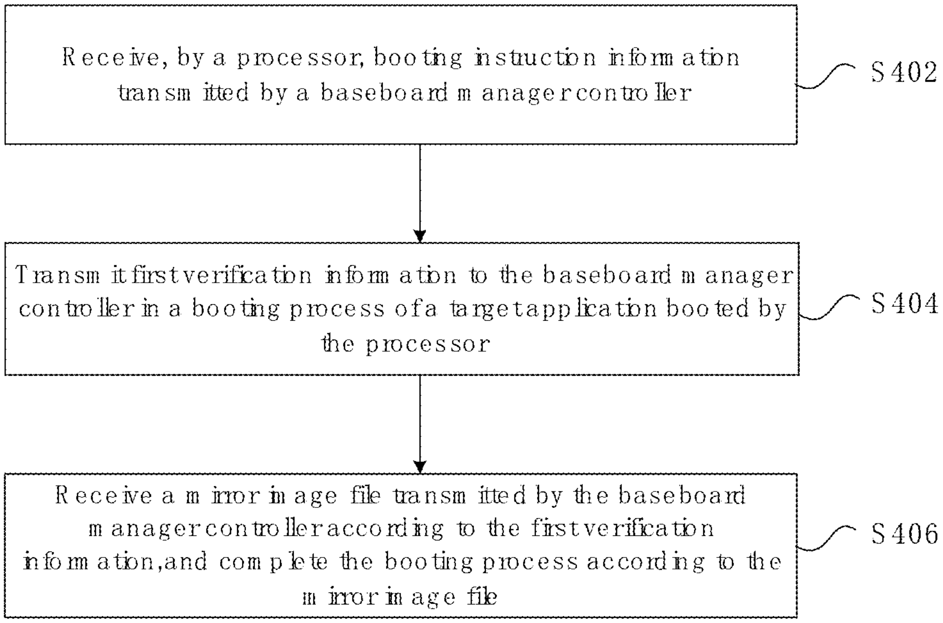
FIG. 4 is a flowchart of another method of booting an application according to an example of the disclosure.

The example provides a method for booting an application of a processor configured to run a target application in an electronic device. The electronic device may be a server, a terminal device, etc. FIG. 4 is a flowchart of a method of booting an application according to an example of the disclosure. As shown in FIG. 4, the flow includes the following steps:

S402, a processor receives booting instruction information transmitted by a baseboard manager controller. A mirror image file of a target application is stored in the baseboard manager controller. The booting instruction information is configured to instruct the processor to boot the target application according to the mirror image file.

In the technical solution provided by S402, before the processor receives the booting instruction information transmitted by the baseboard manager controller, the method of booting an application further includes: a switching state of a target switch is determined, wherein the switching state includes a first state and a second state, the first state is configured to indicate that the booting process of the target application is completed jointly by the baseboard manager controller and the processor, and the second state is configured to indicate that the booting process of the target application is completed independently by the processor; in a case that it is determined that the switching state is the first state, the booting instruction information transmitted by the baseboard manager controller is received; and in a case that it is determined that the switching state is the second state, the booting process of the target application is directly executed.

In some examples of the disclosure, the step that the booting process of the target application is directly executed includes: after any booting phases of the plurality of booting phases is completed, the first verification information is transmitted to the baseboard manager controller, and the booting process continues to be executed until all the booting phases are completed.

S404, first verification information is transmitted to the baseboard manager controller in a booting process of the target application booted by the processor. The first verification information is configured to indicate whether a fault exists in the booting process of the target application.

In the technical solution provided by S404, the booting process includes a plurality of booting phases, the first verification information is verification information generated by the processor after completing a first booting phase, the first booting phase is any booting phase of the plurality of booting phases except the last booting phase, and different booting phases correspond to different first verification information.

As an optional embodiment, second verification information corresponding to the first booting phase is stored in the baseboard manager controller, and in a case that it is determined that the first verification information is consistent with the second verification information, it is determined that no fault exists in the first booting phase.

S406, the mirror image file transmitted by the baseboard manager controller according to the first verification information is received, and the booting process is completed according to the mirror image file.

Before the processor receives the booting instruction information transmitted by the baseboard manager controller, the method of booting an application further includes: the switching state of the target switch is determined, where the switching state includes the first state and the second state, the first state is configured to indicate that the booting process of the target application is completed jointly by the baseboard manager controller and the processor, and the second state is configured to indicate that the booting process of the target application is completed independently by the processor; in a case that it is determined that the switching state is the first state, the booting instruction information transmitted by the baseboard manager controller; and in a case that it is determined that the switching state is the second state, the booting process of the target application is directly executed. Thus, a problem that a phase in which a fault occurs cannot be quickly and accurately located when a BIOS application fails to be booted due to independent running of the booting process of the BIOS application in the related art is solved, thus achieving an effect of quickly locating the phase in which a fault occurs when the BIOS application fails to be booted.

From the description of the embodiments, those skilled in the art can clearly understand that the methods according to the examples can be implemented through software plus a necessary general-purpose hardware platform, or through hardware. In most cases, the former is a better embodiment. With such understanding, the technical solution of the disclosure, in essence or from the view of part contributing to the prior art, may be embodied in a form of a computer software product. The computer software product is stored in a storage medium (such as an ROM/random access memory (RAM), a magnetic disk, and an optical disk) and includes several instructions configured to enable a terminal device (which may be a mobile phone, a computer, a server, a network device, etc.) to execute the method of each example of the disclosure.

Figure 5:
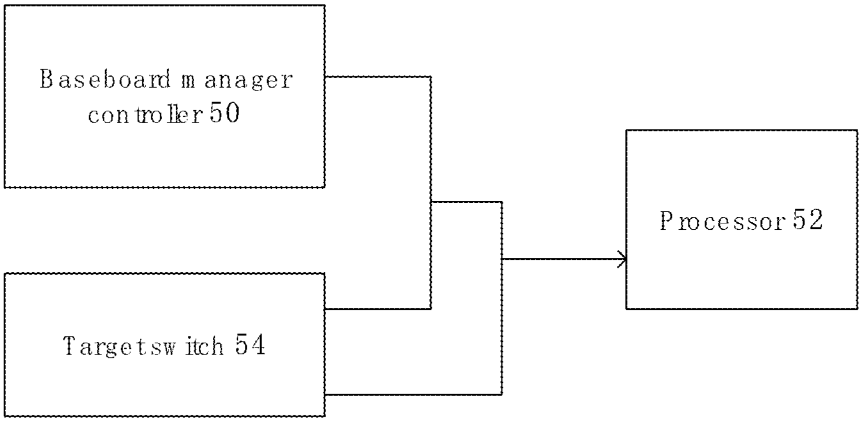
FIG. 5 is a structural block diagram of a server according to an example of the disclosure.

The example further provides a server. The server is configured to implement the examples and the embodiments, and will not be repeated herein. FIG. 5 is a structural block diagram of a server according to an example of the disclosure. As shown in FIG. 5, the server includes: a baseboard manager controller 50, a processor 52, and a target switch 54. The baseboard manager controller 50 is configured to store a mirror image file of a target application. The processor 52 is configured to complete a booting process of the target application. A switching state of the target switch 54 includes a first state and a second state. The first state is configured to indicate that the booting process of the target application is completed jointly by the baseboard manager controller 50 and the processor 52. The second state is configured to indicate that the booting process of the target application is completed independently by the processor 52. The baseboard manager controller 50 is further configured to transmit, in a case that it is determined that the switching state is the first state, booting instruction information to the processor 52. The booting instruction information is configured to instruct the processor 52 to boot the target application according to the mirror image file; receive first verification information transmitted by the processor 52 in the booting process of the target application by the processor 52, wherein the first verification information is configured to indicate whether a fault exists in the booting process of the target application; and transmit, in a case that it is determined that no fault exists in the booting process of the target application according to the first verification information, the mirror image file to the processor 52 until the processor 52 completes the booting process.

In some illustrative examples, in a case that it is determined that the switching state is the second state, the processor 52 independently completes the booting process of the target application, and transmits the first verification information to the baseboard manager controller 50 in the booting process; the baseboard manager controller 50 is configured to generate a log file, which is configured to record process information of the booting process according to the first verification information.

In some illustrative examples, the baseboard manager controller 50 includes a storage module. The storage module is configured to store the mirror image file of the target application, and store second verification information in one or more preset bits of the mirror image file of the target application. The second verification information is configured to indicate whether a fault exists in the booting process together with the first verification information.

In some illustrative examples, in a case that it is determined that the switching state is the first state, the baseboard manager controller 50 is further configured to generate a log file, which is configured to record whether a fault exists in the booting process according to the first verification information and the second verification information.

In some illustrative examples, the server further includes an alarm apparatus. The alarm apparatus is connected to the baseboard manager controller 50. After the baseboard manager controller determines that a fault exists in the booting process of the target application, the alarm apparatus is configured to generate alarm information under the control of the target application.

In some illustrative examples, the baseboard manager controller 50 is connected to the processor 52 through a wired communication link.

The example further provides an apparatus for booting an application. The apparatus is configured to implement the examples and the embodiments, and will not be repeated herein. The term "module", as configured below, may implement a combination of software and/or hardware having predetermined functions. While the apparatus described in the following examples is preferably implemented in software, implementation in hardware or a combination of software and hardware is also possible and conceivable.

Figure 6:
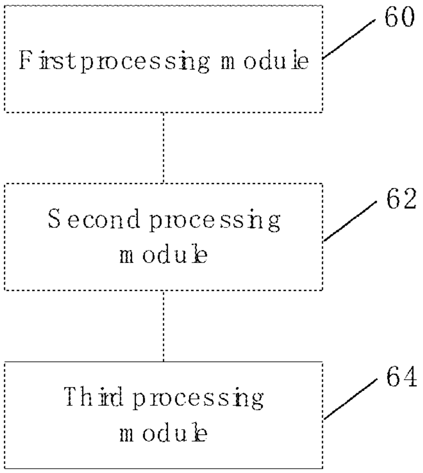
FIG. 6 is a structural block diagram of an apparatus of booting an application according to an example of the disclosure.

FIG. 6 is a structural block diagram of an apparatus of booting an application according to an example of the disclosure. As shown in FIG. 6, the apparatus includes a first processing module 60 configured to transmit booting instruction information to a processor, wherein a mirror image file of a target application is stored in a baseboard manager controller, and the booting instruction information is configured to instruct the processor to boot the target application according to the mirror image file; a second processing module 62 is configured to receive first verification information transmitted by the processor in a booting process of the target application by the processor, where the first verification information is configured to determine whether a fault exists in the booting process of the target application; and a third processing module 64 is configured to transmit, in a case that it is determined that no fault exists in the booting process according to the first verification information, the mirror image file to the processor until the processor completes the booting process.

In some illustrative examples, before the baseboard manager controller transmits the booting instruction information to the processor, the first processing module 60 is further configured to: obtain the mirror image file of the target application; and obtain second verification information and a correspondence between the second verification information and a booting phase of the booting process, and store the second verification information in one or more preset bits of the mirror image file.

In some illustrative examples, the step that the first processing module 60 of the baseboard manager controller transmits the booting instruction information to the processor includes: a switching state of a target switch is determined, wherein the switching state includes a first state and a second state, the first state is configured to indicate that the booting process of the target application is completed jointly by the baseboard manager controller and the processor, and the second state is configured to indicate that the booting process of the target application is completed independently by the processor; and the booting instruction information is transmitted to the processor according to the switching state.

In some examples of the disclosure, the step that the first processing module 60 transmits the booting instruction information to the processor according to the switching state includes: the baseboard manager controller transmits the booting instruction information to the processor in a case that it is determined that the switching state is the first state; in a case that it is determined that the switching state is the second state, that the booting instruction information is controlled not transmitted to the processor, and in a case that it is determined that the booting process of the target application is completed independently by the processor, the first verification information transmitted by the processor is received; and a third log file is generated according to the first verification information, where the third log file is configured to record process information of the booting process.

In some examples of the disclosure, the booting process includes a plurality of booting phases. The first verification information is verification information generated by the processor after completing a first booting phase. The first booting phase is any booting phase of the plurality of booting phases except the last booting phase. Different booting phases correspond to different first verification information.

In some examples of the disclosure, after the first verification information transmitted by the processor is received, the second processing module 62 is further configured to: determine second verification information corresponding to the first booting phase, wherein the second verification information is verification information pre-stored in the baseboard manager controller; and the first verification information with the second verification information are compared, and in a case that it is determined that the first verification information is consistent with the second verification information, it is determined that no fault exists in the first booting phase.

In some examples of the disclosure, after it is determined that no fault exists in the first booting phase, the second processing module 62 is further configured to: generate a first log file corresponding to the first booting phase. The first log file is configured to record successful boot of the first booting phase.

In some examples of the disclosure, after the first verification information and the second verification information are compared, the second processing module 62 is configured to: determine, in a case that it is determined that the first verification information is inconsistent with the second verification information, that a booting failure exists in the first booting phase; generate a second log file corresponding to the first booting phase, where the second log file is configured to record identity information of the first booting phase and the first verification information and the second verification information corresponding to the first booting phase; and transmit the second log file to a target device, where the target device is configured to determine whether the target application is successfully booted.

In some illustrative examples, the step that the third processing module 64 transmits the mirror image file to the processor includes the following step: transmit, after it is determined that no fault exists in the first booting phase, a mirror image file corresponding to a second booting phase to the processor, wherein the second booting phase is a booting phase whose booting sequence is after the first booting phase and which is adjacent to the first booting phase in the plurality of booting phases.

It should be noted that all the modules may be implemented by software or hardware. In the latter case, the modules are located in a same processor, or all the modules are separately located in different processors in any combination form, which is not restrictive.

An example of the disclosure further provides a non-volatile readable storage medium. The non-volatile readable storage medium stores a computer program. The computer program is configured to execute the steps in any one of the above method examples at runtime. For instance, the computer program may be configured to execute the method for booting an application as follows: transmit, by a baseboard manager controller, booting instruction information to a processor, wherein a mirror image file of a target application is stored in the baseboard manager controller, and the booting instruction information is configured to instruct the processor to boot the target application according to the mirror image file; receive first verification information transmitted by the processor in a booting process of the target application by the processor, wherein the first verification information is configured to determine whether a fault exists in the booting process of the target application; and transmit, in a case that it is determined that no fault exists in the booting process, the mirror image file is transmitted to the processor until the processor completes the booting process.

In some examples, when the computer program is executed, the method for booting an application may be executed as follows: receive, by a processor, booting instruction information transmitted by a baseboard manager controller, wherein a mirror image file of a target application is stored in the baseboard manager controller, and the booting instruction information is configured to instruct the processor to boot the target application according to the mirror image file; transmit first verification information to the baseboard manager controller in a booting process of the target application booted by the processor, where the first verification information is configured to indicate whether a fault exists in the booting process of the target application; and receive the mirror image file transmitted by the baseboard manager controller according to the first verification information, and the booting process is completed according to the mirror image file.

Figure 7:
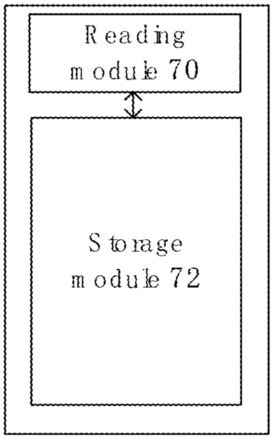
FIG. 7 is a schematic structural diagram of a non-volatile readable storage medium according to an example of the disclosure.

In some illustrative examples, the non-volatile readable storage medium may include, but is not limited to, a universal serial bus (USB) flash disk, a read-only memory (ROM), a random access memory (RAM), a mobile hard disk, a magnetic disk, an optical disk, and various media capable of storing computer programs. In addition, as shown in FIG. 7, the non-volatile readable storage medium at least includes a reading module 70 and a storage module 72. The storage module is configured to store a computer program, etc. The reading module is configured to interact with other devices or other components in a same device, such that the other devices or other components may invoke the computer program in the storage module 72.

Figure 8:
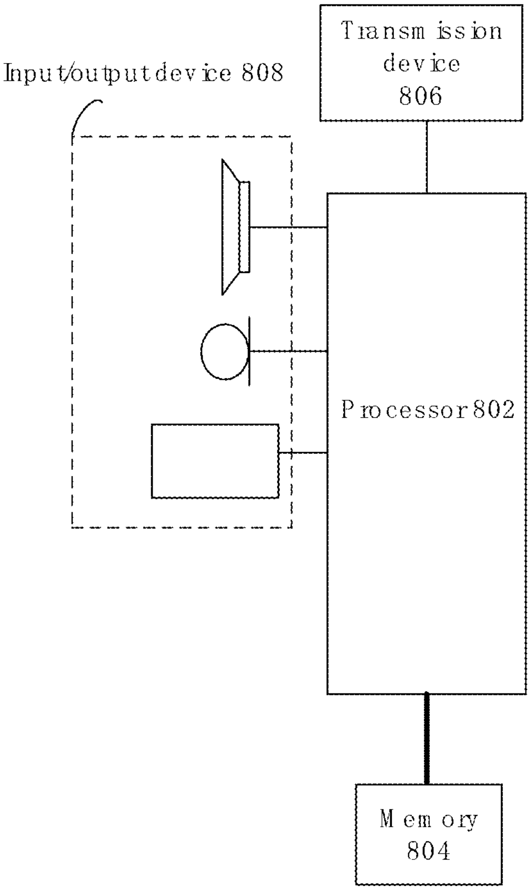
FIG. 8 is a structural block diagram of an electronic device according to an example of the disclosure.

An example of the disclosure further provides an electronic device. As shown in FIG. 8, the electronic device includes a processor 802 and a memory 804. The memory 104 stores a computer program. The processor 102 is configured to run the computer program, so as to execute the steps in any one of the above method examples. For instance, the method of booting an application may be run as follows: transmitting, by a baseboard manager controller, booting instruction information to a processor, wherein a mirror image file of a target application is stored in the baseboard manager controller, and the booting instruction information is configured to instruct the processor to boot the target application according to the mirror image file; receiving first verification information transmitted by the processor in a booting process of the target application by the processor, wherein the first verification information is configured to determine whether a fault exists in the booting process of the target application; and transmitting, in a case that it is determined that no fault exists in the booting process, the mirror image file to the processor until the processor completes the booting process.

In some examples, the processor 802 may run the method for booting an application as follows: receiving, by a processor, booting instruction information transmitted by a baseboard manager controller, where a mirror image file of a target application is stored in the baseboard manager controller, and the booting instruction information is configured to instruct the processor to boot the target application according to the mirror image file; transmitting first verification information to the baseboard manager controller in a booting process of the target application booted by the processor, where the first verification information is configured to indicate whether a fault exists in the booting process of the target application; and receiving the mirror image file transmitted by the baseboard manager controller according to the first verification information, and the booting process is completed according to the mirror image file.

In some illustrative examples, as shown in FIG. 8, the electronic device may further include a transmission device 806 and an input/output device 808. The transmission device is connected to the processor. The input/output device is connected to the processor.

Reference may be made to instances described in the examples and illustrative embodiments for optional instances in the examples, which will not be repeated by the example herein.

Obviously, those skilled in the art should understand that all modules or steps of the disclosure may be implemented with a general-purpose computation apparatus, and may be centralized on a single computation apparatus or distributed on a network consisting of a plurality of computation apparatuses. The modules or steps may be implemented with program codes executable by the computation apparatus, such that the modules or steps may be stored in a storage apparatus so as to be executed by the computation apparatus. Moreover, in some cases, the steps shown or described may be executed in an order different from that herein, the modules or steps may be fabricated separately as individual integrated circuit modules, or a plurality of modules or steps in the modules or steps may be fabricated as a single integrated circuit module for implementation. Thus, the disclosure is not limited to any particular combination of hardware and software.

What are described above are merely optional examples of the disclosure and are not intended to limit the disclosure, and various changes and modifications can be made by those skilled in the art. Any modifications, equivalent substitutions, improvements, and the like within the principles of the disclosure are intended to be included within the protection scope of the disclosure.

The invention claimed is:

1. A method of booting a target application, comprising:
 transmitting, by a baseboard manager controller, booting instruction information to a processor, wherein a mirror image file of the target application is stored in the baseboard manager controller, and the booting instruction information is configured to instruct the processor to boot the target application according to the mirror image file, wherein the transmitting comprises:
  determining that a switching state of a target switch comprises a first state, the first state configured to indicate that a booting process of the target application is completed jointly by the baseboard manager controller and the processor;
  transmitting, by the baseboard manager controller, the booting instruction information to the processor;
 receiving first verification information transmitted by the processor in the booting process of the target application by the processor;
 determining that no fault exists in the booting process of the target application according to the first verification information; and
 transmitting the mirror image file to the processor until the processor completes the booting process.

2. The method of booting the target application according to claim 1, wherein the booting process comprises a plurality of booting phases, the first verification information is verification information generated by the processor after completing a first booting phase, the first booting phase is any booting phase of the plurality of booting phases except a final booting phase, and different booting phases correspond to different first verification information.

3. The method of booting the target application according to claim 2, wherein after the receiving the first verification information transmitted by the processor, the method of booting the target application further comprises:
 determining second verification information corresponding to the first booting phase, wherein the second verification information is verification information prestored in the baseboard manager controller; and
 comparing the first verification information with the second verification information, and determining that no fault exists in the first booting phase.

4. The method of booting the target application according to claim 3, wherein the transmitting the mirror image file to the processor comprises:
 transmitting, after it is determined that no fault exists in the first booting phase, the mirror image file corresponding to a second booting phase to the processor, wherein the second booting phase is a booting phase whose booting sequence is after the first booting phase and which is adjacent to the first booting phase in the plurality of booting phases.

5. The method of booting the target application according to claim 3, wherein after it is determined that no fault exists in the first booting phase, the method further comprises:
 generating a first log file corresponding to the first booting phase, wherein the first log file is configured to record successful boot of the first booting phase.

6. The method of booting the target application according to claim 1, wherein before the transmitting, the method further comprises:
 obtaining the mirror image file of the target application; and
 obtaining second verification information and a correspondence between the second verification information and a booting phase of the booting process, and storing the second verification information in one or more preset bits of the mirror image file.

7. A non-transitory computer readable storage medium storing a computer program that implements the method according to claim 1.

8. An electronic device comprising a memory, and a computer program stored in the memory that implements the method according to claim 1.

9. A method of booting a target application, comprising:
 determining that a switching state of a target switch comprises a first state, the first state configured to indicate that a booting process of the target application is completed jointly by a baseboard manager controller and a processor;
 receiving, by the processor, booting instruction information transmitted by the baseboard manager controller, wherein a mirror image file of the target application is stored in the baseboard manager controller, and the booting instruction information is configured to instruct the processor to boot the target application according to the mirror image file;
 transmitting first verification information to the baseboard manager controller in the booting process of the target application booted by the processor, wherein the first verification information is configured to indicate that no fault exists in the booting process of the target application; and
 receiving the mirror image file transmitted by the baseboard manager controller, and completing the booting process according to the mirror image file.

10. The method of booting the target application according to claim 9, wherein the booting process comprises a plurality of booting phases, the first verification information is verification information generated by the processor after completing a first booting phase, the first booting phase is any booting phase of the plurality of booting phases except a final booting phase, and different booting phases correspond to different first verification information.

11. The method of booting the target application according to claim 10, wherein second verification information corresponding to the first booting phase is stored in the baseboard manager controller, and determining that the first verification information is consistent with the second verification information, the determining that the first verification information is consistent with second verification information indicating that no fault exists in the first booting phase.

12. The method of booting the target application according to claim 9, wherein the method further comprises:
 transmitting, after any booting phase of a plurality of booting phases is completed, the first verification information to the baseboard manager controller, and continuing to execute the booting process until all the booting phases are completed.

13. A server, comprising a baseboard manager controller, a processor, and a target switch, wherein,
 the baseboard manager controller is configured to store a mirror image file of a target application;

the processor is configured to complete a booting process of the target application;

a switching state of the target switch comprises a first state or a second state, the first state configured to indicate that the booting process of the target application is completed jointly by the baseboard manager controller and the processor, and the second state configured to indicate that the booting process of the target application is completed independently by the processor; and the baseboard manager controller is further configured to:

transmit, in a case that it is determined that the switching state is the first state, booting instruction information to the processor, wherein the booting instruction information is configured to instruct the processor to boot the target application according to the mirror image file;

receive first verification information transmitted by the processor in the booting process of the target application by the processor, wherein the first verification information is configured to indicate whether a fault exists in the booting process of the target application; and transmit, in a case that it is determined that no fault exists in the booting process of the target application according to the first verification information, the mirror image file to the processor until the processor completes the booting process.

14. The server according to claim 13, wherein in a case that it is determined that the switching state is the second state, the processor independently completes the booting process of the target application, and transmits the first verification information to the baseboard manager controller in the booting process; and the baseboard manager controller is configured to generate a log file, which is configured to record process information of the booting process according to the first verification information.

15. The server according to claim 13, wherein the baseboard manager controller comprises a storage module, and the storage module is configured to store the mirror image file of the target application, and store second verification information in one or more preset bits of the mirror image file of the target application, wherein the second verification information is configured to indicate whether a fault exists in the booting process together with the first verification information.

16. The server according to claim 15, wherein in a case that it is determined that the switching state is the first state, the baseboard manager controller is further configured to generate a log file, which is configured to record whether a fault exists in the booting process according to the first verification information and the second verification information.

17. The server according to claim 13, further comprising an alarm apparatus, wherein the alarm apparatus is connected to the baseboard manager controller, and after the baseboard manager controller determines that a fault exists in the booting process of the target application, the alarm apparatus is configured to generate alarm information under control of the target application.

18. The server according to claim 13, wherein the baseboard manager controller is connected to the processor through a wired communication link.

* * * * *